UNITED STATES PATENT OFFICE.

FRITZ BENDER AND MICHAEL KÄMMERER, OF MÜHLHEIM-ON-THE-MAIN, GERMANY, ASSIGNORS TO A. LEONHARDT & CO., OF SAME PLACE.

YELLOW-RED DYE.

SPECIFICATION forming part of Letters Patent No. 489,623, dated January 10, 1893.

Application filed February 17, 1892. Serial No. 421,867. (Specimens.) Patented in England January 21, 1892, No. 1,231, and in France January 29, 1892, No. 219,023.

*To all whom it may concern:*

Be it known that we, FRITZ BENDER and MICHAEL KÄMMERER, both subjects of the Emperor of Germany, residents at Mühlheim-on-the-Main, Germany, have invented a new and useful Improvement in Coloring-Matter, (for which patents have been obtained with our consent in England, No. 1,231, dated January 21, 1892, and in France, No. 219,023, dated January 29, 1892,) of which the following is a specification.

We have found that the pink to bluish red basic coloring matters derived from dialkylmetaamidophenols (such as the rhodamines of dialkylmetaamidophenol or dialkylmetaamidocresol and phthalic acid, or derived from succinic acid or formic acid or the pink coloring matters which are the subject of United States Patent No. 445,684 granted to Fritz Bender, February 3, 1891, or the benzoines when treated with strong oxidizing agents are transformed into other coloring matters of a more yellowish red tint. As oxidizing agents permanganate of potassium has given the best results but peroxide of manganese or of lead together with dilute sulphuric acid and heat would also do.

Instead of using in this process the bluish red coloring matters themselves their products of reduction (or leuco-compounds) may be employed. In this case the leuco-compounds are first transformed into the corresponding coloring matters which by further oxidation yield the yellowish red compounds. It is possible thus by varying the quantities of the oxidizing agent employed to change the original bluish red tints more or less into yellowish red ones. The coloring matter obtained in such a way has the following characteristics. It is of a basic nature forming salts only with acids. It is soluble in water or spirit yielding scarlet solutions showing a brilliant greenish fluorescence. In concentrated sulphuric acid it is dissolved giving a yellowish solution which by diluting with water turns from orange into scarlet. It is principally adapted for dyeing and printing mordanted or unmordanted cotton and silk, the latter dyed therewith showing a yellowish fluorescence. In its chemical properties it is similar to the corresponding dyestuffs either obtained from monoalkylized metaamidophenols or obtained by alkylating partially the corresponding derivatives of metaamidophenol itself.

To fully illustrate our invention we give the following example. Eight kilos of rhodamine derived from succinic acid are dissolved in four hundred liters of water and twenty liters of acetic acid and to the cold solution a solution of four kilos of permanganate of potassium in one hundred liters of water is gradually added, the mass being well stirred during the addition of the oxidizing agent. The oxidation is already effected in the cold. The liquid is then boiled and filtered and when cooled down (after a renewed filtration if necessary) the coloring matter is precipitated with chloride of zinc and common salt. If in this process we employ less permanganate we obtain a more bluish red product. If we employ too much of the oxidizing agent the whole of the dyestuff will be gradually destroyed.

What we claim as our invention is:

1. The process of transforming the bluish red dyestuffs derived from dialkylmetaamidophenols, such as mentioned in the specification or their corresponding leuco-compounds, into other coloring matter of a more yellowish red tint, which consists in treating said compound by an oxidizing agent, such as potassium permanganate, and separating the color, substantially as described.

2. The yellowish red coloring matter derived from dialkylmetaamido phenols, which dissolves in water or spirit yielding scarlet solutions showing a brilliant greenish fluorescence, dissolving in sulphuric acid giving a yellowish solution which by diluting with water turns from orange into scarlet.

In testimony whereof we have signed our names to this specification in the presence of two subscribing witnesses.

FRITZ BENDER.
MICHAEL KÄMMERER.

Witnesses:
FRANZ HAPLACHER,
FRIEDRICH CÖRRELL.